United States Patent [19]

Nilsson

[11] Patent Number: 4,994,183
[45] Date of Patent: Feb. 19, 1991

[54] ROTATING FILTER WITH OUTER FILTRATE CONDUITS

[76] Inventor: Bjarne Nilsson, Lanterngatan 9, S-462 00, Vänersborg, Sweden

[21] Appl. No.: 319,235
[22] PCT Filed: Jun. 22, 1988
[86] PCT No.: PCT/SE88/00349
§ 371 Date: Feb. 24, 1989
§ 102(e) Date: Feb. 24, 1989
[87] PCT Pub. No.: WO88/10144
PCT Pub. Date: Dec. 29, 1988

[30] Foreign Application Priority Data

Jun. 24, 1987 [SE] Sweden .................................. 8702620

[51] Int. Cl.$^5$ .............................................. B01D 33/26
[52] U.S. Cl. .................................... 210/247; 210/331; 210/346
[58] Field of Search ............... 210/330, 331, 346, 347, 210/390, 461, 486, 487, 333.01, 333.1

[56] References Cited

U.S. PATENT DOCUMENTS

| | | | |
|---|---|---|---|
| 893,104 | 7/1908 | Schorr | 210/331 |
| 2,464,223 | 3/1949 | Genter | 210/331 |
| 3,291,312 | 12/1966 | Peterson | 210/486 |
| 3,485,376 | 12/1969 | Peterson | 210/486 |
| 4,634,529 | 1/1987 | Nilsson | 210/486 |
| 4,637,876 | 1/1987 | Dosoudil | 210/346 |
| 4,676,901 | 6/1987 | Ragnegard | 210/486 |
| 4,678,575 | 7/1987 | Frykhult | 210/346 |
| 4,686,040 | 8/1987 | Nilsson | 210/486 |

FOREIGN PATENT DOCUMENTS

| | | | |
|---|---|---|---|
| 2740350 | 3/1978 | Fed. Rep. of Germany | 210/331 |
| 1002664 | 3/1952 | France | 210/346 |

Primary Examiner—Richard V. Fisher
Assistant Examiner—Joseph Drodge
Attorney, Agent, or Firm—Pollock, Vande Sande & Priddy

[57] ABSTRACT

A disk filter including a plurality of rotatable, annular filter disks (3) arranged mutually spaced in an axial direction, and disposed for being partially immersed in a liquid or a suspension to be filtered. Each filter disk comprises a plurality of filter sections (4) which are in communication with axially directed filtrate conduits (2) arranged in the peripheries of the disks (3) for discharge of filtrate. The filtrate conduits (2) are provided with backwash barriers which are adapted to prevent liquid flow from the filtrate conduits radially inwards when the filter sections (4) rise above the liquid surface. The backwash barriers have been achieved by each filter section (4) being connected to an axial filtrate conduit in the form of a pipe (2), the main portion of the cross-section of the pipe at the place of attachment being located after each part of the filter section (4) as seen in the direction of rotation (A).

7 Claims, 1 Drawing Sheet

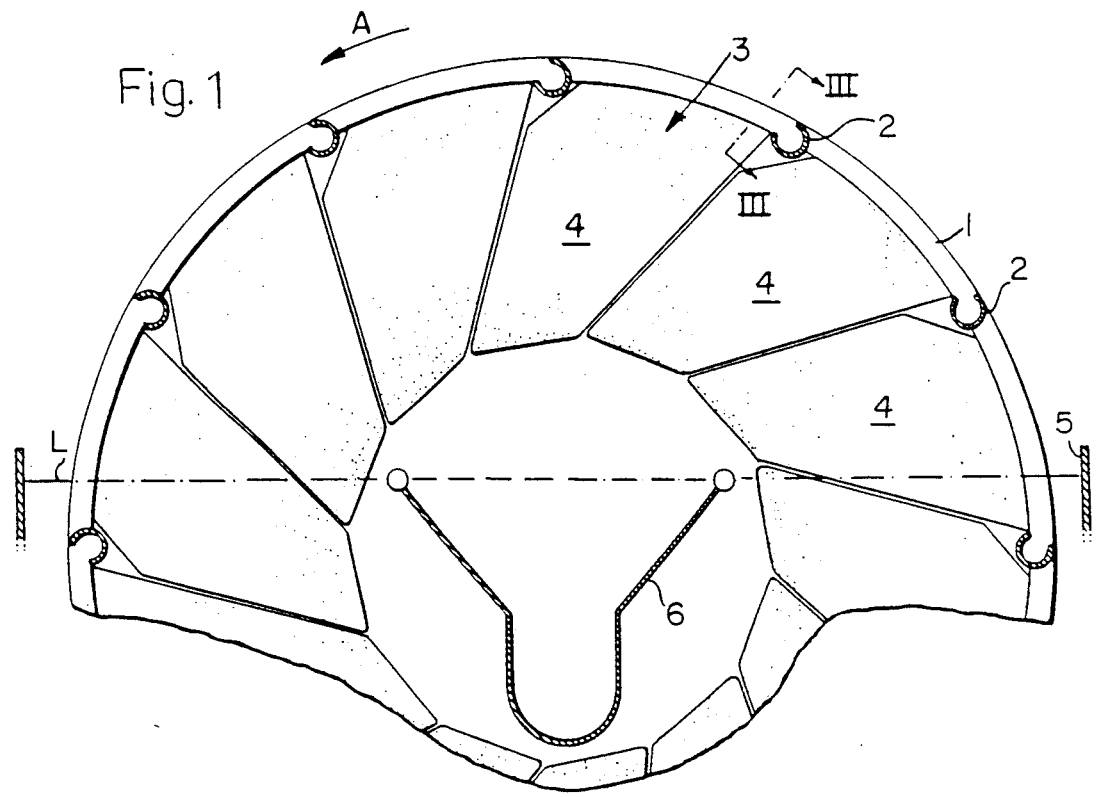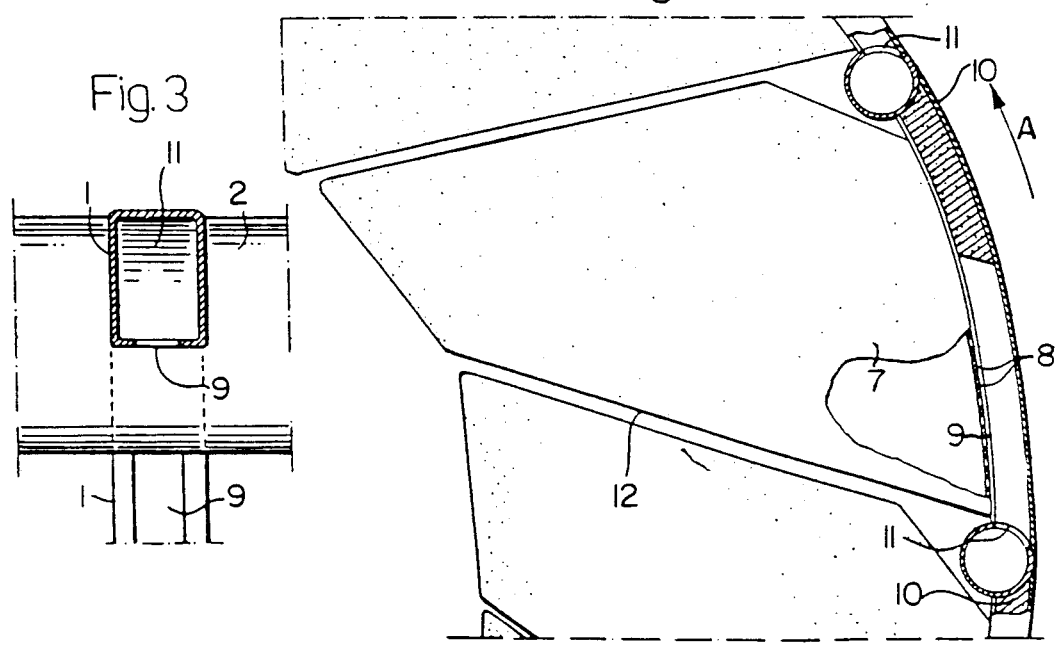

ROTATING FILTER WITH OUTER FILTRATE CONDUITS

FIELD OF THE INVENTION

The present invention relates to a disk filter including a plurality of rotatable, axially spaced annular filter disks adapted to be partially immersed in a liquid or a suspension to be filtered, each disk comprising a plurality of filter sections in communication with axially directed filtrate discharge conduits at the peripheries of the annular filter disks, said filtrate conduits being provided with backwash barriers adapted to prevent liquid flow from the filtrate conduits radially inwards when the filter sections rise above the liquid surface.

BACKGROUND OF THE INVENTION

A filter of this kind is described, e.g., in SE-C-8305817-2 and corresponding EP-B1-0160069 and U.S. Pat. No. 4,634,529, respectively. According to this patent, the backwash barriers, i.e., barriers preventing re-wetting of a filter cake, such as dehydrated fibers, deposited on the filter elements, extend from each filter element into associated axially directed conduits and comprise an extension of the trailing edge of the filter element as seen in the direction of rotation. It has been found that backwash barriers arranged in this way are relatively complicated to accomplish in practice.

SUMMARY OF THE INVENTION

The object of the present invention is consequently to provide a disk filter of the kind described above, but with backwash barriers which can be realized in a simpler, more practical fashion.

BRIEF DESCRIPTION OF THE DRAWINGS

An embodiment of the invention will now be described with reference to the accompanying drawings, in which:

FIG. 1 is a partial cross-section through a filter rotor;

FIG. 2 is a detail on a larger scale of the filter rotor; and

FIG. 3 is a section along line III—III in FIG. 1 on a further enlarged scale.

DESCRIPTION OF PREFERRED EMBODIMENT

A filter rotor for a filter driven in rotation by conventional drive means (not shown) includes a plurality of axially spaced annular filter disk holders 1 and filtrate conduits 2 connecting them axially. FIG. 1 is cross-section through such a filter rotor, which carries an annular filter disk 3 comprising a plurality of filter sections 4. All the filter sections of the filter are partially immersed in the liquid to be filtered, which is received in a container 5. Extending through the central opening of the filter disks is a collecting trough 6 for solid material such as cellulose fibers, which are deposited on the filter sections during filtration and are caused to fall from the sections when the latter are above the trough.

The illustrated filter sections are of the type including two spaced frame elements (not shown in detail) and a filter cloth 7 kept spaced from the elements. The frame elements are adapted for leading filtrate flowing through the filter cloth 7 to the space between the frame elements. From this space the filtrate can flow through radial outlet openings 8 in the outer periphery of the filter section 4.

The filter disk holder 1 has a substantially U-shaped cross-section with the opening 9 of the cross-section facing radially inwardly. The filter sections 4 are mounted on the filter disk holder 1 so that their outlet openings 8 connect to the opening 9. The filtrate can thus flow from the interior of the filter sections 4 to the interior of the filter disk holders 1. The outlet openings 8 are preferably arranged only in that part of the periphery of the filter sections 4 which is least to rise above the liquid surface for rotation of the filter rotor in the direction indicated by the arrow A. The interior of the filter disk holder 1 is suitably filled with a compound 10 in the portion which is located upstream of the outlet openings 8 in the direction of the rotation.

The filter holder 1 and the axially directed filtrate conduits 2 are connected to each other such that the conduits 2, illustrated here as being circular pipes, extend uninterruptedly through all the filter disk holders 1, while the latter, at least from the flow aspect, are interrupted at each axial filtrate conduit 2. More specifically, the arrangement is such that the axial filtrate conduits 2 have openings 11 facing in the direction of rotation A and are formed to match the cross-section of the filter disk holder 1 (FIG. 3). The section of the filter holder 1 is tightly welded around these openings 11. The filter disk holder 1 is also welded to the opposite end of the filter conduits 2, where the tube wall is unbroken. A flow connection is thus achieved from the interior of the filter sections 4 to the axial filtrate conduits 2.

In accordance with the invention, and as clearly shown in the drawings, the main part of the cross-section of the filtrate conduits 2 is located at the trailing end of the associated filter section as oriented in the direction of rotation A. This means that as long as the filtrate flows from a filter section, the associated axial filtrate conduit 2 is located under the filter section and can receive and discharge filtrate.

Preferably, an imaginary extension of the filtrate section trailing edge 12 in the direction of rotation A would be tangent to the associated axial filtrate conduit 2. This means, in particular when the filter sections 4 have the illustrated oblique shape, that the openings 11 of the axial filtrate conduits 2 are above the bottoms of the conduits when the conduits 2 are in their uppermost position, i.e., the filtrate in the conduits 2 is effectively prevented from running back into the filter sections.

To further improve the removal of filtrate through the conduits 2, a filter section 4 in one filter disk is displaced relative a filter section 4 in the next filter disk as oriented in the flow direction of the conduits 2, so that in the direction of rotation A the first mentioned filter section is in advance of the other filter section (not shown). The filtrate conduit 2 to which these two filter elements are connected will thus slope downwards in the flow direction when the filter sections rise above the liquid level. In such a case it is also suitable that the radial filtrate conduits to which the axial filtrate conduits 2 are connected and which lead to the filtrate discharge of the filter, slope downwards when the filter sections connected to the associated axial filtrate conduit 2 rise above the liquid surface.

I claim:

1. A disk filter including a plurality of rotatable, axially spaced annular filter disks (3) adapted to be partially immersed in a fluid to be filtered, each of said filter disks comprising a plurality of filter sections (4) carried by an annular disk holder (1) having an inner periphery mounting said filter sections, and each filter section including spaced filtering means (7), wherein said annular disk holder includes an annular channel having a radially inwardly directed opening (9), each of said filter sections being mounted to said annular disk holder such that spaces between said filtering means are in fluid communication with said channel through said opening (9), said channel being in fluid communication from above with an axially directed filtrate discharge conduit (2) in rotational positions of said filter disk when said filter section rised above a surface of said fluid upon rotation of said filter disk.

2. A disk filter according to claim 1, wherein each of said axial filtrate discharge conduits extends through each of said annular disk holders.

3. A disk filter according to claim 1, wherein an outer peripheral edge of each filter section includes outlet openings (8) for filtrate located at a portion of said outer peripheral edge last rising above said fluid surface upon rotation of said filter disk said outlet openings being connected for fluid communication with said opening (9) of said channel, and wherein portions of said opening and said channel not connected for fluid communication with said outlet openings are filled with a compound (10).

4. A disk filter including a plurality of rotatable, axially spaced annular filter disks (3) adapted to be partially immersed in a fluid to be filtered, each of said disks comprising a plurality of filter sections (4), each filter section including spaced filtering means (7), a space between said filtering means of each said filter section being in fluid communication with an axial filtrate discharge conduit (2) extending between outer peripheries of said filter disks, said axial filtrate discharge conduit (2) having an opening (11) therein for receiving filtrate from an associated one of said filter sections (4), said opening being provided in a portion of said axial filtrate discharge conduit facing substantially upwards in a rotational position of said filter disk (3) when said associated filter section (4) rises above a surface (L) of said fluid to be filtered upon rotation of said filter disk, and said associated filter section in said rotational position being located substantially entirely above said axial filtrate discharge conduit and being in fluid communication therewith from above through said opening (11), thereby preventing filtrate received in said axial filtrate discharge conduit from flowing back into said associated filter section in rotational positions of said filter disk more advanced than said rotational position, wherein said filter section (4) is in fluid communication with an annular channel (1) located at said outer periphery of said filter disk (3), said annular channel (1) being in fluid communication radially inwardly with said filter sections and circumferentially with said axial filtrate discharge conduit (2).

5. A disk filter as claimed in claim 1 or 4, wherein said axial filtrate discharge conduit comprises a tube (2) having a circular cross-section, an imaginary extension of a trailing edge (12) of said filter section (4) being substantially tangential to said axial filtrate discharge conduit (2).

6. A disk filter according to claim 1 or 4, wherein each of said filter sections (4) of one of said filter disks (3) is circumferentially displaced relative to a corresponding one of said filter sections (4) of an adjacent one of said filter disks (3), the displacement being such that said axial filtrate conduit slopes towards an outlet of said filter in said rotational position of said filter.

7. A disk filter according to claim 6, wherein each of said axial filtrate conduits (2) is connected to a substantially radially inwardly directed filtrate conduit, said substantially radially directed filtrate conduit sloping towards said outlet in said rotational position of said filter.

* * * * *